(12) United States Patent
Elsegood

(10) Patent No.: US 6,835,308 B2
(45) Date of Patent: Dec. 28, 2004

(54) MAGNETIC FLUID FILTER

(75) Inventor: Stewart D. Elsegood, Balmoral Beach (AU)

(73) Assignee: Boss Components (Australia) Pty Ltd, Sydney (AU)

( * ) Notice: Subject to any disclaimer, the term of this patent is extended or adjusted under 35 U.S.C. 154(b) by 132 days.

(21) Appl. No.: 10/277,529

(22) Filed: Oct. 21, 2002

(65) Prior Publication Data

US 2003/0116494 A1 Jun. 26, 2003

Related U.S. Application Data

(63) Continuation-in-part of application No. 10/032,276, filed on Dec. 21, 2001, now abandoned.

(51) Int. Cl.⁷ .............................. B01D 35/06; B03C 1/02
(52) U.S. Cl. ...................... 210/222; 210/223; 184/6.25; 123/196 A
(58) Field of Search ................................ 210/222, 223, 210/695; 184/6.25; 123/196 A

(56) References Cited

U.S. PATENT DOCUMENTS

| | | | |
|---|---|---|---|
| 4,501,660 A | 2/1985 | Hebert | 210/209 |
| 5,882,514 A * | 3/1999 | Fletcher | 210/222 |
| 6,139,737 A | 10/2000 | Gizowski | 210/223 |
| 6,143,171 A * | 11/2000 | Van Aarsen | 210/222 |

FOREIGN PATENT DOCUMENTS

| | | | |
|---|---|---|---|
| DE | 3431 661 A | 3/1985 | |
| DE | 3431 661 A1 | 3/1985 | |
| EP | 0 237 923 B1 | 9/1987 | |
| EP | 1 076 601 B1 | 8/2002 | |
| GB | 2163977 A * | 3/1986 | ........... B01D/35/06 |
| WO | WO 97/04873 | 2/1997 | |

* cited by examiner

Primary Examiner—David A. Reifsnyder
(74) Attorney, Agent, or Firm—Knobbe Martens Olson & Bear LLP

(57) ABSTRACT

A magnetic fluid filter for filtering metallic particles from a fluid flow system. The filter comprises a magnetic array, a central support for the magnetic array, and arm pieces for positioning the effective range of the magnetic array in a fluid flow environment. The magnetic array includes a plurality of disc shaped magnets arranged with poles in opposition, interleaved with the arm pieces and disc shaped pole pieces.

38 Claims, 10 Drawing Sheets

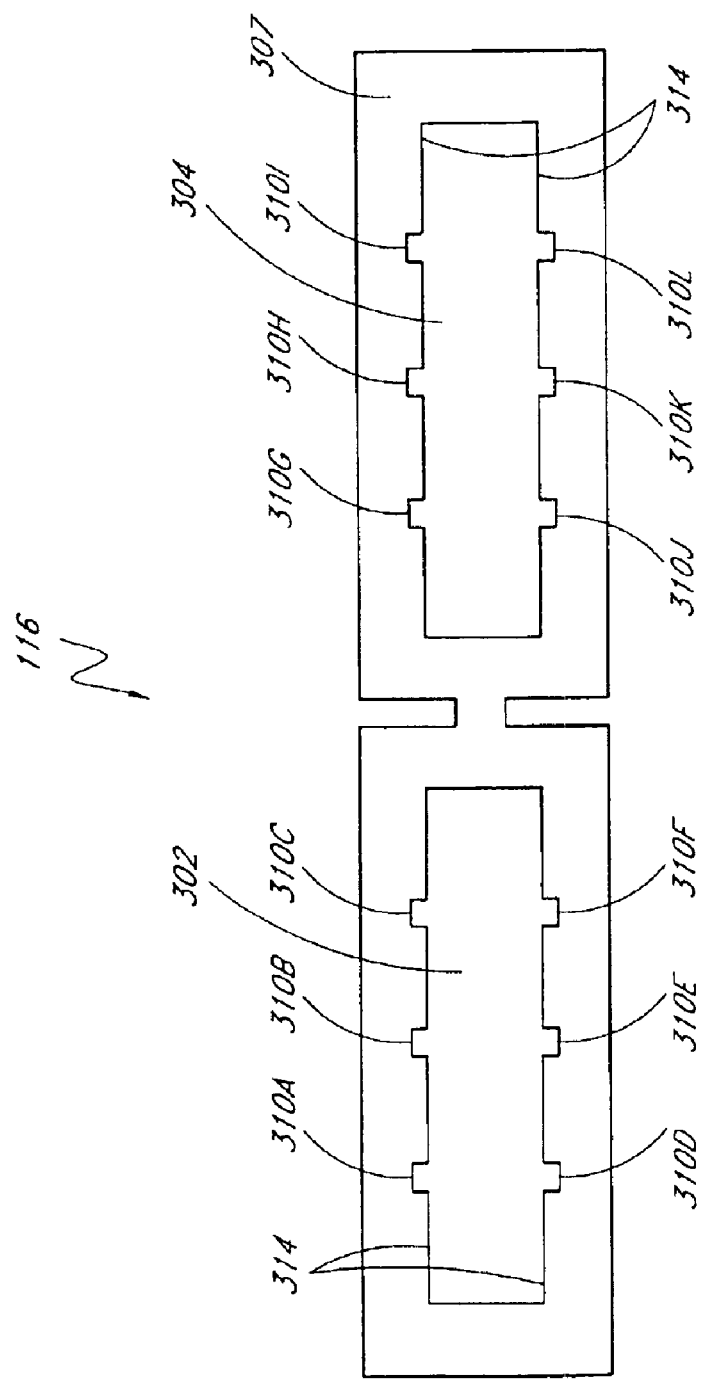

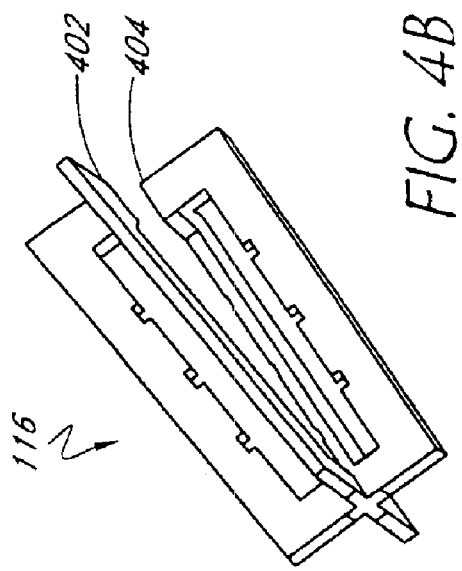
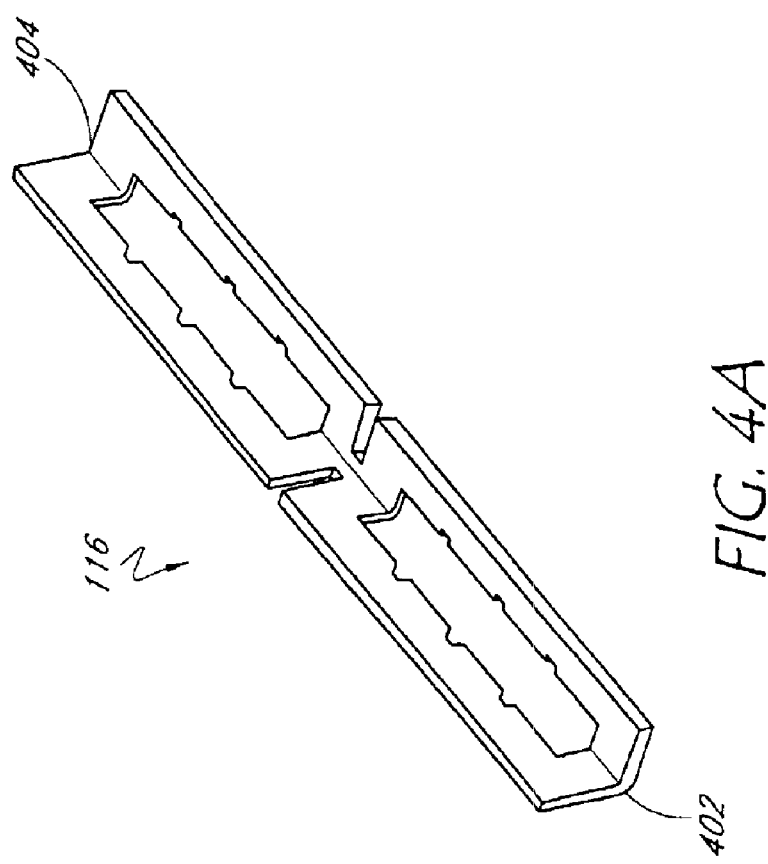

MAGNETIC FLUID FILTER

CROSS REFERENCE TO RELATED APPLICATION

This application is a continuation-in-part of U.S. patent application Ser. No. 10/032,276 entitled "MAGNETIC FLUID FILTER" and filed on Dec. 21, 2001, now abandoned. The disclosure of the above-described filed application is hereby incorporated by reference in its entirety.

BACKGROUND OF THE INVENTION

1. Field of the Invention

The present invention relates to a filter, and more particularly a magnetic filter for removing solid particles from a fluid.

2. Description of the Related Art

It is common practice to use fluids to lubricate moving parts of mechanical systems. Foreign particles are often shed by the mechanical system in operation into the lubricating fluid where it can cause wear and damage to the operating system and its components. Many mechanical systems already make use of primary filters to remove foreign particles from the lubricating fluid of the system such as oil filter cartridges in an automobile engine or transmission system.

The majority of contaminant particles in a mechanical system are metallic in nature and therefore subject to magnetic attraction. For this reason, others have attempted to integrate magnets with conventional filters to provide removal of metallic particles. However, prior magnetic filters were typically limited in that their design was specific for a particular application environment. For example, the majority of current magnetic filters are limited to their application to engine oil filtration systems within automobiles. Moreover, such filters are typically connected to the external flow path of the fluid to be filtered.

Accordingly, it would be advantageous for a magnetic filter to have the capability of being integrated into any fluid system requiring filtering of metallic particles, and for the magnetic components in the filter to be in closer proximity to the direct flow of the fluid through the filtering device.

SUMMARY OF THE INVENTION

A filter apparatus comprises a magnetic array for removing metallic particles from a fluid, the magnetic array comprising a plurality of magnets and a plurality of pole pieces, wherein the pole pieces are interleaved between the magnets, a plurality of arm pieces extending substantially radially from a center axis of the filter apparatus, and an assembly piece configured to support the magnets, pole pieces, and arm pieces.

In the filter apparatus, the plurality of magnets can be disc shaped, and the pole pieces can have a larger diameter than the magnets. The magnetic array may comprise 3, 4, 5 or 6 magnets disposed a distance apart from one another so that a polar repulsion force is maintained between each magnet and its nearest neighbor magnet.

The arm pieces can be configured to reversibly mount the filter apparatus to the inside of a conventional oil filter, a filter cartridge element, a fluid reservoir, a transmission fluid flow line, or a hydraulic fluid flow line. The arm pieces may comprise a disc shaped center and a plurality of arms extending substantially radially from the disc shaped center.

A fluid filter apparatus comprises a magnetic array, comprised of a plurality of magnets arranged in a like-pole to like-pole orientation, wherein the magnets are separated by a plurality of pole pieces. The fluid filter apparatus further comprises a plurality of arm pieces extending substantially radially from a center axis of said magnetic array, and a support piece configured to support the magnetic array in a fluid flow path such that fluid is allowed to flow over the magnetic array and pass within the effective magnetic range of the array in order to extract ferrous contaminants from the fluid.

In the fluid filter apparatus, the fluid can be power steering fluid, and the center support piece can comprise a rod configured to support the magnetic array along a center axis. The rod may also be flexible so as to allow the filter to bend for insertion in a fluid flow path.

In the fluid filter apparatus, the pole pieces can have a larger diameter than that of the magnets, and the arm pieces can have a disc shaped center and a plurality of arms extending from the disc shaped center.

BRIEF DESCRIPTION OF THE DRAWINGS

FIG. 3 is an illustration of a magnet support piece before it is folded.

FIG. 4A is a perspective view of the magnet support piece of FIG. 3 after a first fold is made.

FIG. 4B is a perspective view of the magnet support piece of FIG. 4 after a second fold is made.

DETAILED DESCRIPTION OF THE PREFERRED EMBODIMENT

Embodiments of the invention relate to a magnetic fluid filter for filtering metallic particles from a fluid flow system.

One example of such a fluid flow system is a power steering unit in an automobile. This embodiment includes a cylindrical outer casing mated to two end pieces for incorporating the filter into a fluid flow line.

Inside the magnetic fluid filter is an array of magnets that is held in place by a support. In one embodiment, the magnetic array has a plurality of disc shaped magnets separated by "pole pieces". The magnets, each having a north pole and south pole, are arranged in a like-pole to like-pole configuration (north to north and south to south), and separated by the pole pieces. This configuration of magnetic like-poles creates a large magnetic gradient that attracts metallic particles to the surface of the array.

As can be imagined, embodiments of the invention are not limited to the specific magnetic array described above. For example, the magnetic array can include 3, 4, 5, 6 or more magnets disposed a distance apart from one another so that a polar repulsion force is maintained between each magnet and its nearest neighbor magnet.

The magnet support can be made from a folded and punched piece of non-magnetic material, such as stainless steel. Notched or cut out sections within the support provide a nest for the magnetic array centrally along the length of the case such that fluid flowing through the case is within the effective range of the magnetic array. The pole pieces can have a larger diameter than that of the magnets such that as fluid flows over the array the pole piece provides a shelter on the downstream side of the pole piece for the magnetically attracted metallic particles in the fluid. Alternatively, the pole pieces can have a smaller diameter than the magnets to provide a reservoir for the magnetically attracted metallic particles.

The arrangement of the magnets within the cylindrical case allows fluid flow in either direction. In addition to bi-directional fluid flow, because there is no device that can be filled or blocked, the filter can allow full flow of fluid at all times.

Figure 1:
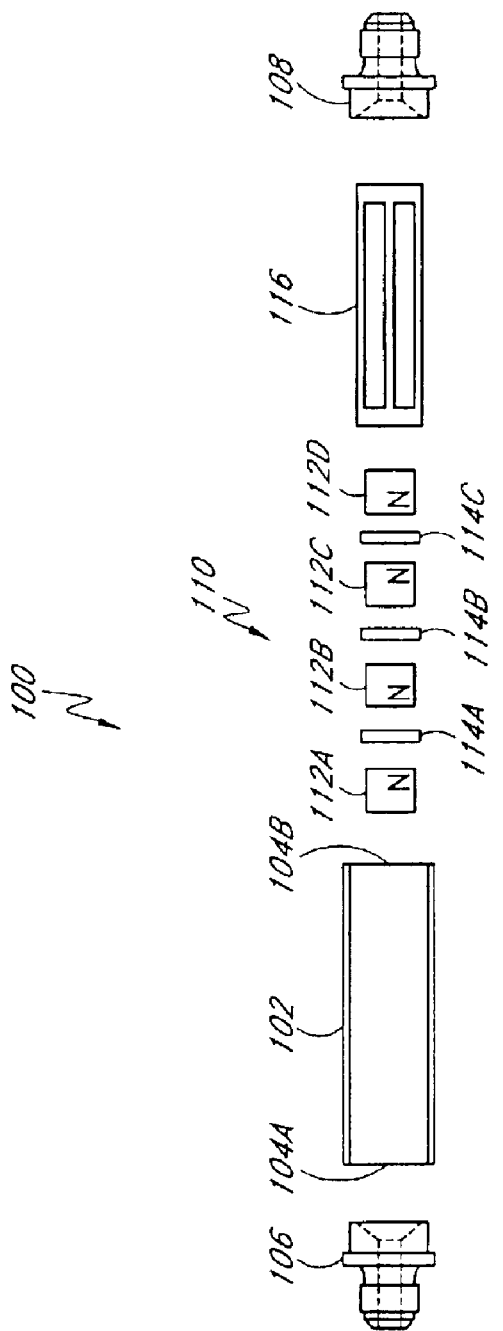
FIG. 1 is a cross-sectional assembly view of one embodiment of a magnetic fluid filter.

FIG. 1 is a cross-sectional assembly view of a magnetic fluid filter 100. The filter 100 comprises a hollow cylindrical case 102 that is preferably made of a non-magnetic material. The case 102 has two circular open ends 104A, B into which a first and second hollow end pieces 106, 108 can be secured. The end pieces 106, 108 allow for installment of the filter 100 into any fluid line such that the end pieces 106, 108 provide secure attachment to the fluid flow system and an inlet and/or outlet whereby fluid is allowed to flow inside the case 102 of the filter 100. The end pieces 106, 108 can be of a screwed connection type, barb connection, or direct to hose swage connection, or any combination thereof.

The case 102 allows containment of fluid flow over a magnetic array 110 that is disposed within the case 102. The magnetic array 110 includes a series of magnets 112A–D arranged in a like-pole-to-like-pole arrangement, whereby each magnet is separated by a pole piece 114A–C. The magnets 112 and pole pieces 114 are preferably disc shaped. In addition, the pole pieces 114 can vary in width, and in one embodiment are much more narrow than the magnets 112. The pole pieces 114 can be manufactured from a magnetic material, such as iron or steel, and are slightly larger in diameter than the magnets 112A–D in order to provide shelter on the downstream side of the pole piece. The magnetic array 110 will be discussed in further detail with respect to FIGS. 6A and 6B. A magnet support 116 is also illustrated in FIG. 1, and is configured to support the magnetic array 110 within the case 102.

Figure 2:
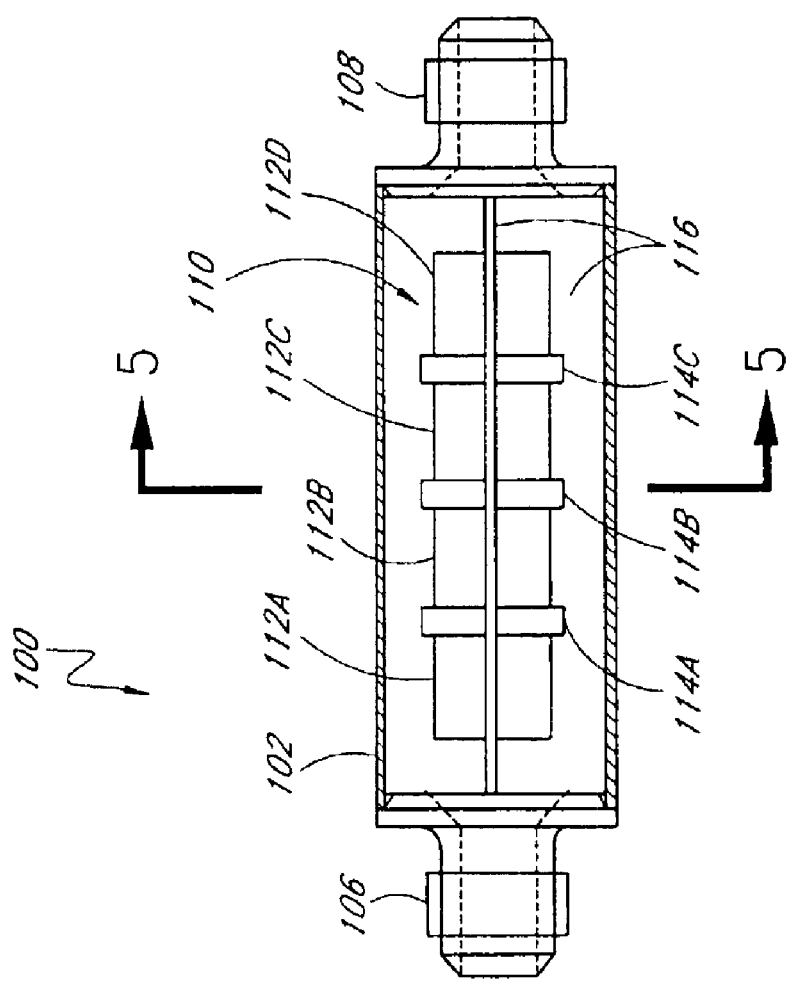
FIG. 2 is a cross-sectional view of one embodiment of a magnetic filter.

A cross-sectional view of the assembled magnetic filter 100 is shown in FIG. 2. The magnet support 116 is contained within the case 102 by contacting the inner wall of the case 102, but allowing for end caps or means for secure attachment of the case 102 to a fluid flow system. As shown, the assembled array 110 is supported within the case 102 by the support 116 extending the length of the case 102. Also shown in FIG. 2 are the end pieces 106, 108 installed on the filter 100 to provide a fluid inlet and outlet to the interior of the case 102.

As can be seen in FIG. 2, as fluid enters the filter 100 it flows over the magnetic array 110 and through the case 102. Therefore, irrespective of the direction of fluid flow, metal particles will be filtered out of the fluid by the magnetic array 110. The filter 100 can therefore be installed in a fluid path irrespective of the direction of fluid flow.

Referring now to FIG. 3, in this embodiment the magnet support 116 is comprised of a punched, and then folded flat piece of stainless steel or other non-magnetic material. The magnet support 116 is formed by punching two voids 302, 304 in a flat piece of steel 307 so that when it is folded, it will have a length corresponding to that of the array 110, and a width corresponding to the diameter of the array 110 (See FIGS. 4 and 5). A plurality of notches 310A–L, having a width corresponding to the width of the pole piece 114, and a depth corresponding to the difference in radius between that of the pole piece 114 and that of the magnet 112, are formed in the inner edges 314 of the magnet support 116. As can be imagined, the larger diameter pole pieces 114A–C can then be mounted inside of the notches 310A–L when the steel 307 is folded into the proper formation. Of course, it should be realized that the magnetic support is not limited to being formed from steel, and can be made from any support material, magnetic or non-magnetic, such as metal or plastic.

Once the proper notches are formed in the steel 307, a first, right angle fold is made along the longitudinal centerline of the punched piece of steel 116 so as to form corners 402, 404 on either end of the punched piece 116 as indicated in FIGS. 4A, B. A second, 180° angle fold is then made along a center axis of the punched piece 116, perpendicular to the axis of the first fold, such that the two corners 402, 404 formed from the first fold are adjacent to one another.

Referring back to FIG. 3, when the magnet support 116 is folded to its final geometry surrounding the magnetic array 110, the magnetic array 110 is secured along four longitudinal inner edges 314 of the support on the peripheral surfaces of the magnets 112A–D and pole piece 114A–C. The outer surfaces of the magnets 112A–D and pole pieces 114A–C are then in contact with the inner edges 314 of the magnet support 116. When the folded magnetic support 116 is placed within the case 102 (See FIGS. 2 and 5), the magnetic disks 112A–D and pole pieces 114A–C are held in place by the inward force placed on the support 116 from the case 102.

Figure 5:
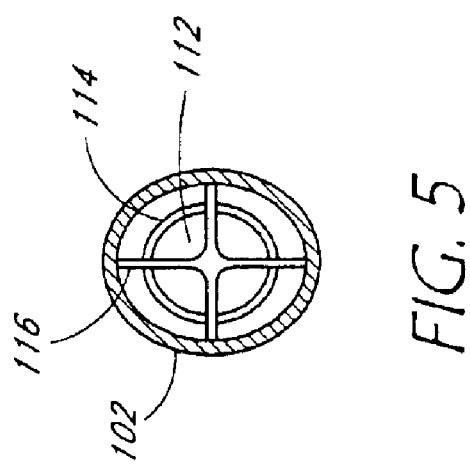
FIG. 5 is a cross section view of the magnetic filter of FIG. 2 taken along the line 5—5.

A cross-section of the magnetic array 110 supported in the case 102 along line 5—5 is shown in FIG. 5. As can be seen in FIG. 5, the folded magnet support 116 forms an "X" shape along the cross section. Of course, the magnet support 116 can be of any geometry, such as any frame having a void corresponding to the shape and dimensions of the magnetic array 110 but not fully encapsulating the array 110, so as to support the array 110 in an effective position in the fluid flow path through the filter 100.

Figure 6A:
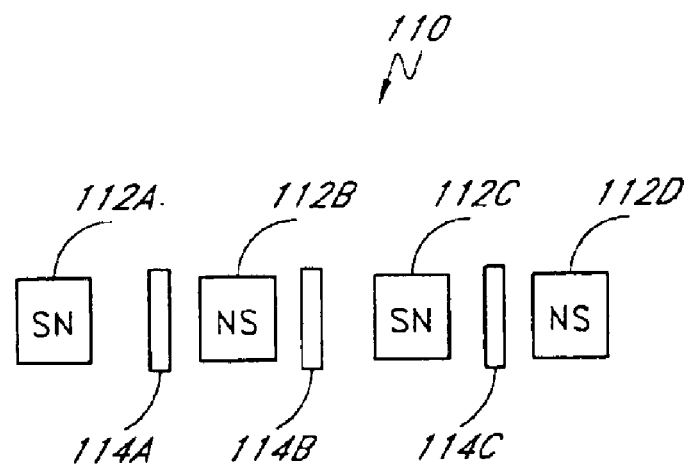
FIG. 6A is a side view assembly stack illustration of a magnetic array.
Figure 6B:
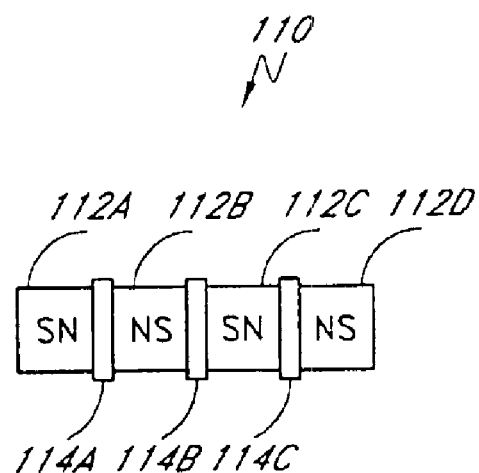
FIG. 6B is a side view of the assembled magnetic array of FIG. 6A.

The magnetic array 110 will now be discussed in further detail with reference to FIGS. 6A and 6B. The like-pole-to-like-pole arrangement of the magnets 112A–D creates a magnified magnetic attraction at the area where the poles are held apart by the pole piece 114A–C. The design presented by the magnetic array 110 increases the amount of non-homogeneous magnetic field produced by a fixed volume of magnetic material.

A magnetic field gradient is necessary to attract ferromagnetic or metal particles, and to hold them in the filter 100. The magnetic attraction force provided by the magnetic field gradient should be greater than competing forces. In this case the competing forces are provided by gravity and fluid flow through the filter 100, wherein even if the fluid flow is great, the filtered particles are simply spread along the length of the array 110. One embodiment of the invention can obtain field gradients as high as 30 T/m close to the pole pieces 114A–C in the array 110. An additional advantage to the array 110 is that it can be more powerful than expensive rare earth magnets, and it is also not affected in performance by heat, as are rare earth magnets. Of course, it will be appreciated that any type of magnet can be used in the array 110.

Figure 7A:
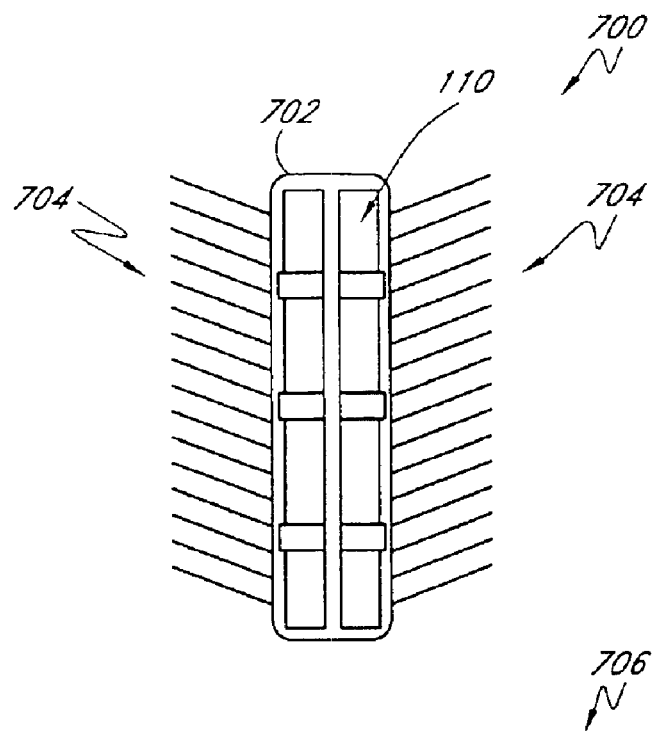
FIG. 7A is a cross sectional side view of an alternative embodiment of the magnetic filter.
Figure 7B:
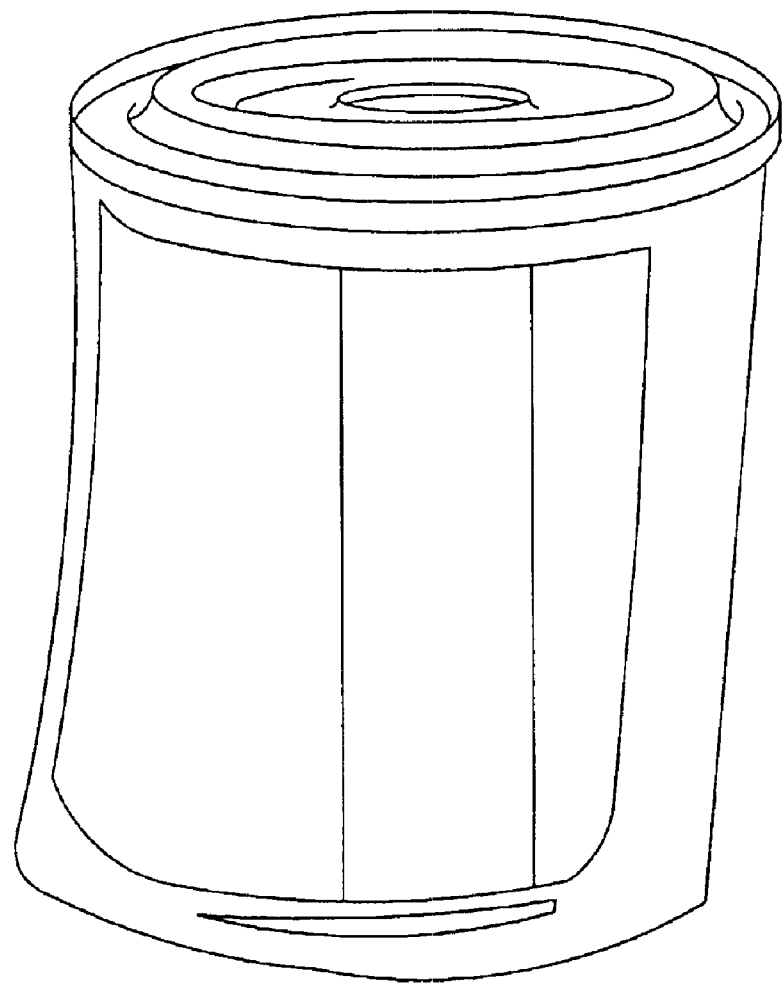
FIG. 7B is a cut away view of a conventional automobile oil filter.

FIG. 7A illustrates a cross sectional view of an alternative embodiment of a magnetic filter 700. The filter 700 comprises the magnetic array 110 as described previously, however a sleeve 702 (of plastic, for example) is disposed around the exterior of the array 110. As shown, the sleeve 702 has a plurality of elastic branches or spines 704 protruding from its outer surface. The spines 704 are designed to be folded back along the sleeve 702 such that the filter 700 can be slidably inserted into the center return shaft of a conventional oil filter 706 (FIG. 7B).

Figure 7C:
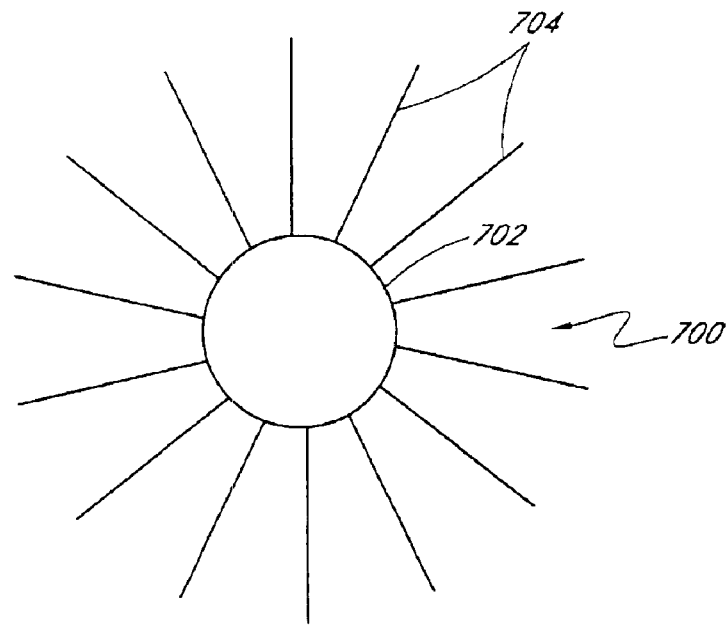
FIG. 7C is a vertical view of the alternative embodiment of the invention of FIG. 7A.

FIG. 7C provides a top view of the filter 700 and its plurality of protruding spines 704 protruding from the sleeve 702. Alternatively, the spines 704 can be directly mounted or incorporated with the magnetic filter 700 along an outer surface of the case 702.

Figure 8:
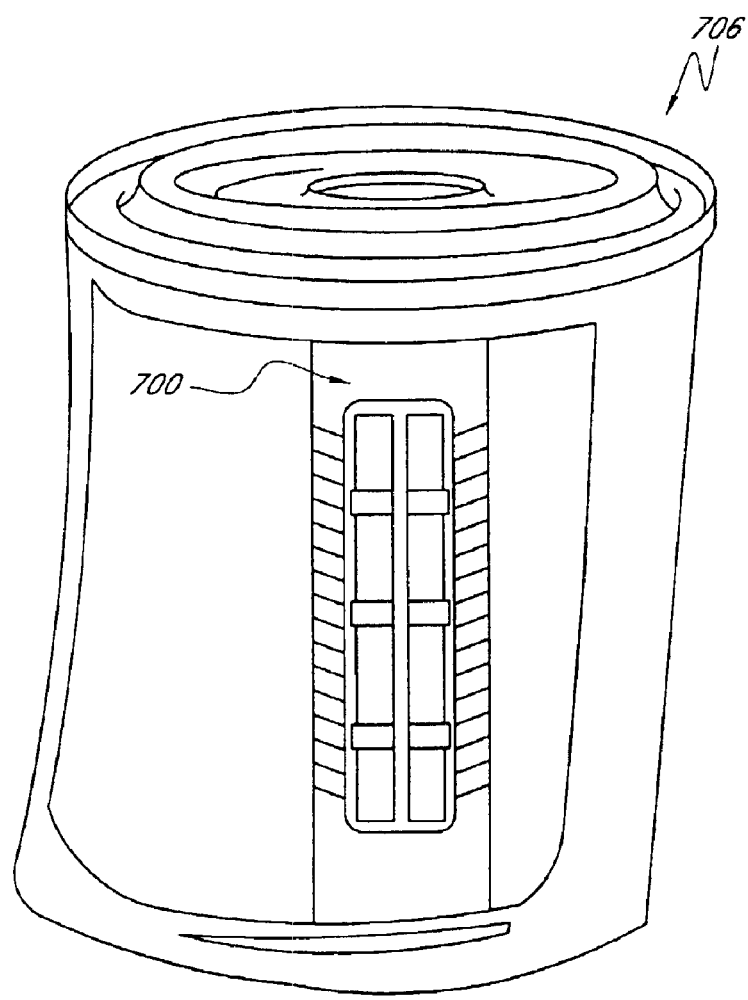
FIG. 8 is a cut away view of the conventional oil filter of FIG. 7B with the magnetic filter of FIG. 7A installed.

FIG. 8 is a cut-away side view of the filter 700 installed in the conventional oil filter 706. The spines 704 are configured to spring outward when installed in the oil filter 706 to hold the filter 700 in position. As oil flows past the magnetic surface of the array 110 metal contaminants are collected on the filter 700.

Figure 9:
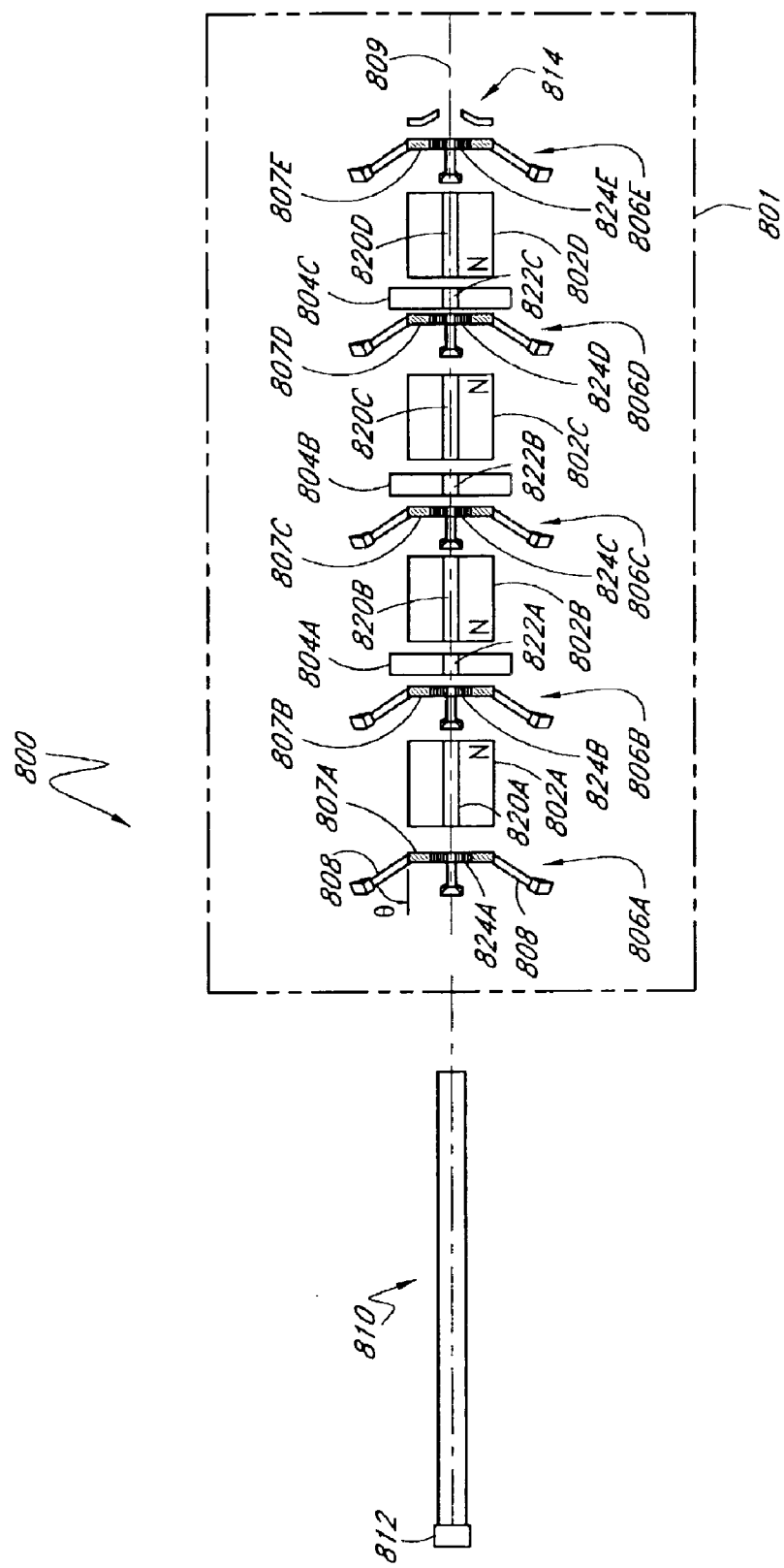
FIG. 9 is a cross-sectional assembly view of one embodiment of a magnetic filter.

An additional embodiment of a magnetic filter 800 is illustrated in FIG. 9, wherein FIG. 9 is a cross-sectional assembly view of the magnetic filter 800. Similar to the magnetic array 110, the magnetic filter 800 comprises an array 801 of a series of magnets 802A–D having a cylindrical shape, wherein the magnets 802A–D are arranged in a like-pole-to-like-pole configuration, and are separated by a plurality of disc shaped pole pieces 804A–C, similar to pole pieces 114. In one embodiment, the pole pieces 804A–C have a greater diameter than the magnets 802A–D, so as to provide shelter for contaminants collected on the magnetic filter 800.

A plurality of arm pieces 806A–E are positioned in the array between the magnets 802A–D along with the pole pieces 804A–C, and at each end of the array 801. The arm pieces 806A–E have disc shaped centers 807A–E with approximately the same diameter as that of the magnets 802A–D, and a plurality of holding arms 808 extending radially outward from the disc shaped centers 807A–E so as to hold the magnetic filter 800 in a substantially fixed position when mounted into a fluid filter. The arm pieces 806A–E extend in a substantially radial direction from a center axis 809 of the array 801, and at an angle θ of approximately 60° from the center axis 809 of the array 801 in one embodiment. Of course, the particular angle of each arm, and number of arms can be changed without departing from the invention. The arm pieces 806A–E are illustrated in more detail in the perspective views of FIGS. 10–11.

As shown in FIG. 9, the magnets 802A–D, pole pieces 804A–C, and arm pieces 806A–E all have a circular void centered along the central axis 809 of the array 801 so as to provide a hollow shaft along the length of the array 801 for accommodation of a center pin 810. The magnets 802A–D have central voids 820A–D, the pole pieces 804A–C have central voids 822A–C, and the arm pieces 806A–E have central voids 824A–E. During assembly, the center pin 810 is slidably inserted into the hollow shaft provided along the central axis of the array 801 so as to assemble the magnets 802A–D, pole pieces 804A–C, and arm pieces 806A–E. As the center pin 810 is inserted, the arm piece 806A is positioned flush against an end piece 812 of the center pin 810. The end piece 812 is preferably designed to have a diameter larger than that of the hole in the arm piece 806A.

To complete the assembly of the magnetic filter 800, a removable end piece 814 is fixed on the center pin 810 against the arm piece 806E so as to hold the array 801 on the center pin 810. The removable end piece 814 can be, for example, a spring clip, a nut, a cotter pin, or any other part, such that a holding force is provided between the removable end piece 814 and the end piece 812 to hold the magnets 802A–D, pole pieces 804A–C, and arm pieces 806A–E in a substantially fixed position. In one embodiment, an end portion of the center pin may be threaded and a complimentary threaded fastener, such as a nut, can be fastened onto the threaded center pin.

Figure 10:
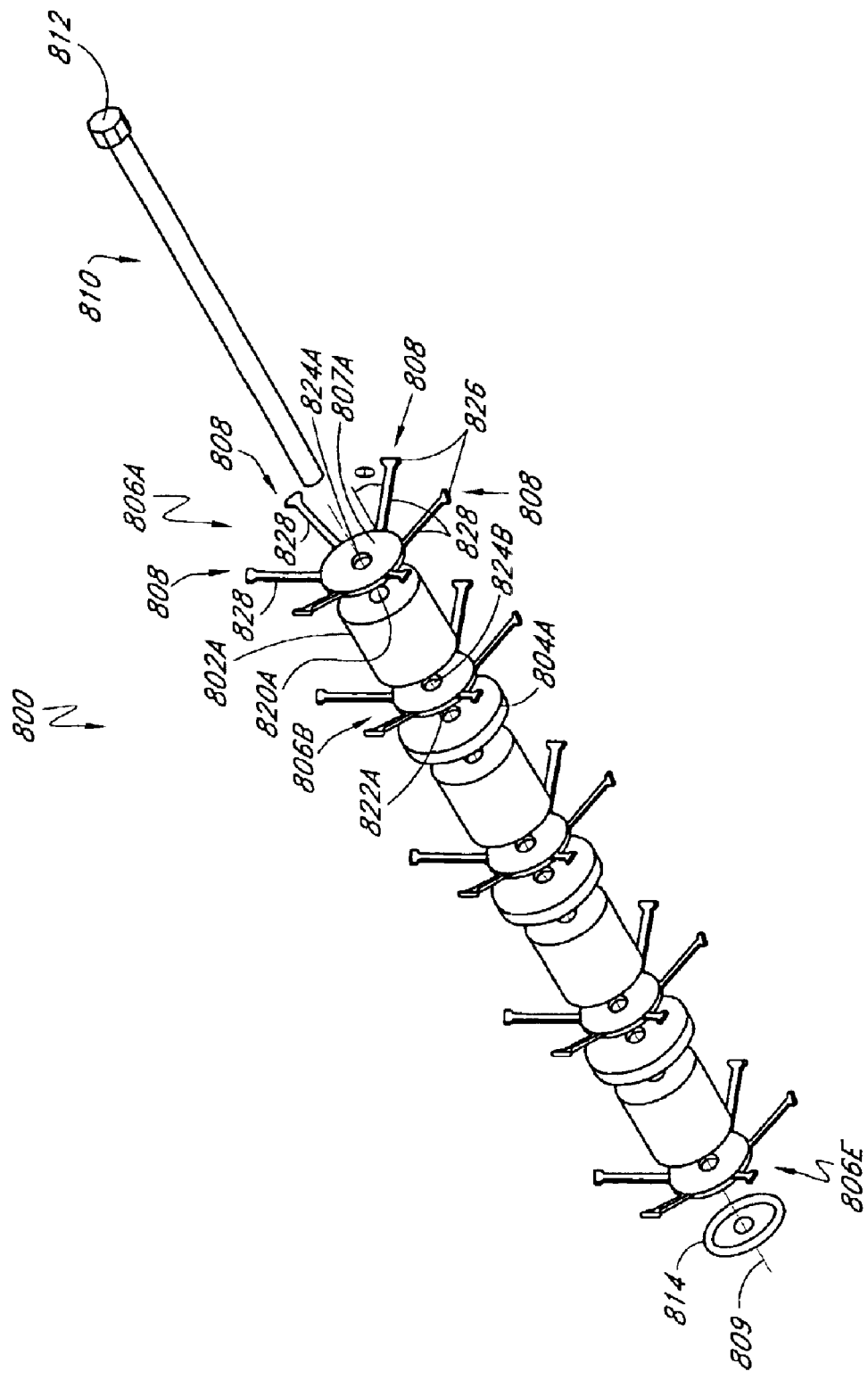
FIG. 10 is a perspective assembly view of the magnetic filter of FIG. 9.

FIG. 10 is a perspective assembly view of the magnetic filter 800, wherein the orientation and angle θ at which the holding arms 808 of the arm pieces 806 extend from the center disc portion 807 can be seen more clearly. An end portion 826 of the holding arms 808 preferably has a greater width than a stem portion 828 of the holding arms 808 so as to provide a hooking, or grabbing point, for the holding arms 808 to attach to a housing or tubing when the magnetic filter 800 is mounted inside a fluid filter. The arm pieces 806A–E are preferably made from a bendable or flexible material, such as a mild steel, such that the arm pieces 806A–E are able to bend when the magnetic filter 800 is inserted into a fluid flow environment. Of course, embodiments of the invention are not limited to arm pieces that are made of any particular type of material. Nor should this embodiment of the invention be limited to holding arms of the described configuration. Other configurations of holding arms such as those that do not have widened end portions are still within the scope of the invention.

As illustrated, during assembly, the center pin 810 is slidably engaged within the central orifices of each filter component. Accordingly, the center pin 810 is adapted to slide snugly through the central orifice 824A of the arm piece 806A, then through the central orifice 820A of the magnet 802A. The center pin 810 is then slid through the central orifice 824B of the arm piece 806B and through the central orifice 822A of the pole piece 804A. The center pin 810 is then slid through the central orifices of the remaining parts until it reaches the removable end piece 814.

Figure 11:
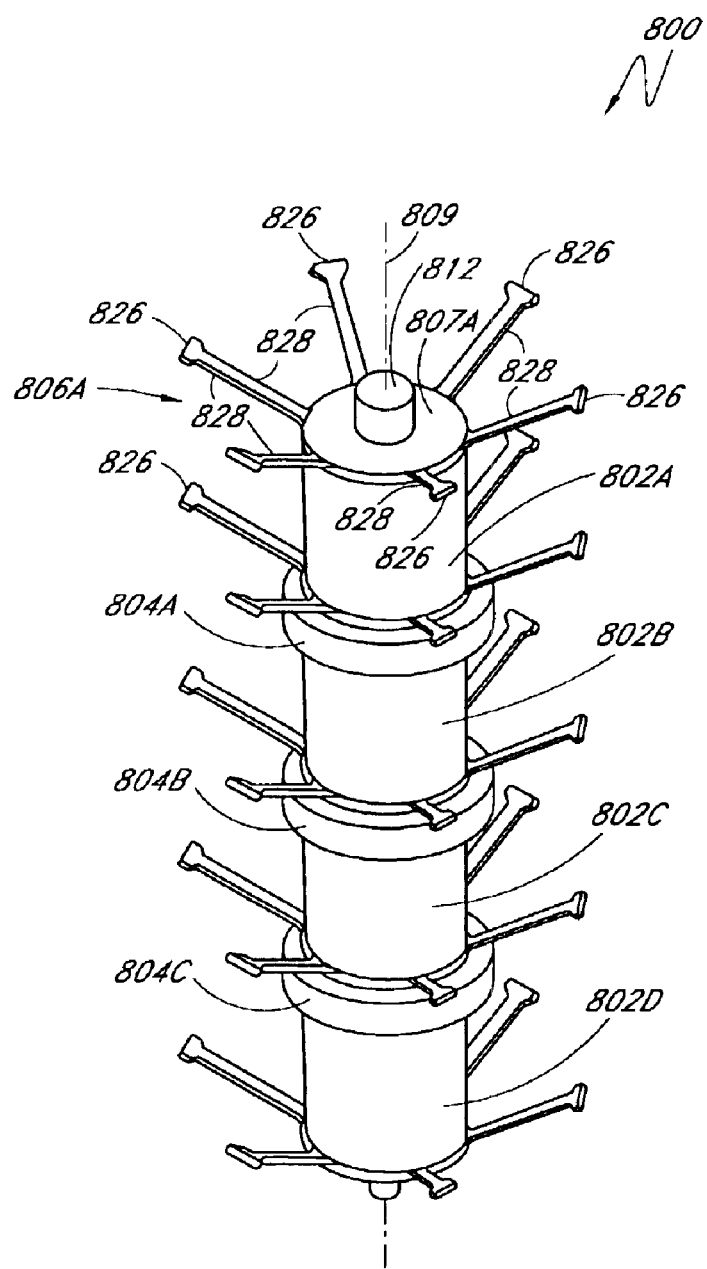
FIG. 11 is a perspective view of the magnetic filter of FIG. 9 in an assembled formation.

FIG. 11 illustrates an assembled magnetic filter 800 wherein the center pin 810 has been fully engaged within the central orifices of the arm pieces, magnets, and pole pieces. The end piece 812 of the center pin 810 is mated against the center portion 807A of the arm piece 806A. Of course it should be realized that this specific configuration is not the only configuration that is within the scope of the invention. For example, more or less number of arm pieces could be positioned within the filter. In addition, the arms themselves need not be on separate pieces, but could be mounted directly on the magnets or pole pieces so long as they provide a holding force for the filter when mounted within a fluid filter.

The magnetic filter 800 can be inserted into the case 102 of the filter 100 to replace the array 110, or the magnetic filter 800 can be installed in a conventional oil filter in a similar fashion to the magnetic filter 700 (FIG. 8). Additionally, the magnetic filter 800 can be installed in a transmission power steering fluid flow line, a replaceable filter cartridge element, a fluid reservoir, or a hydraulics system fluid flow line to attract and trap contaminant particles onto the magnetic filter 800 from the fluids in the flow lines. In one embodiment, the center pin 810 can be made of a flexible material such that the magnetic filter 800 can bend for easier insertion into a fluid flow line or adaptation to a curved fluid flow line, thus making the magnetic filter 800 more versatile with regard to application environments.

Although a preferred embodiment of the filter of the present invention has been discussed in the preceding section, the invention is not limited to this embodiment. Other embodiments which capture the spirit of the invention are also anticipated. The scope of the invention is not limited to the embodiments discussed above, but is only limited by the following claims.

What is claimed is:

1. A filter apparatus comprising:
   a plurality of magnets;
   a plurality of pole pieces, interleaved between said magnets;
   a plurality of arm pieces, extending substantially radially from a center axis of said filter apparatus, wherein said arm pieces extend beyond a radius of at least one of said magnets, and wherein at least one of said plurality of arm pieces is interleaved between said magnets; and
   an assembly piece, configured to support said plurality of magnets, said plurality of pole pieces, and said plurality of arm pieces.

2. The filter apparatus of claim 1, wherein said arm pieces are flexible so as to bend upon insertion of said filter apparatus into a fluid flow environment.

3. The filter apparatus of claim 1, wherein said arm pieces are configured to reversibly mount said filter apparatus to the inside of a conventional oil filter.

4. The filter apparatus of claim 1, wherein said arm pieces are configured to reversibly mount said filter apparatus to the inside of a filter cartridge element.

5. The filter apparatus of claim 1, wherein said arm pieces are configured to reversibly mount said filter apparatus to the inside of a fluid reservoir.

6. The filter apparatus of claim 1, wherein said arm pieces are configured to mount said filter apparatus to the inside of a transmission fluid flow line.

7. The filter apparatus of claim 1, wherein said arm pieces are configured to mount said filter apparatus to the inside of a hydraulic fluid flow line.

8. The filter apparatus of claim 1, wherein each of said arm pieces comprise a disc shaped center portion and a plurality of arms extending substantially radially from said disc shaped center portion, and wherein said arm pieces are interleaved between said magnets.

9. The filter apparatus of claim 1, wherein said arm pieces are mounted to said pole pieces.

10. The filter apparatus of claim 1, wherein an end portion of said arm pieces has a greater width than a stem portion of said arm pieces.

11. The filter apparatus of claim 1, wherein said magnets are disc shaped.

12. The filter apparatus of claim 1, wherein said pole pieces have a larger diameter than said magnets.

13. The filter apparatus of claim 1, wherein said pole pieces maintain a distance between each pair of magnets so that a polar repulsion force is maintained between each magnet and its nearest neighbor magnet.

14. The filter apparatus of claim 1, wherein said magnets are arranged in a like-pole to like-pole orientation.

15. A fluid filter apparatus comprising:
    a magnetic array comprising a plurality of magnets arranged in a like-pole to like-pole orientation;
    a plurality of arm pieces extending substantially radially from a center axis of said magnetic array, wherein said arm pieces extend beyond a radius of at least one of said magnets, and wherein at least one of said plurality of arm pieces is interleaved between said magnets; and
    a support piece configured to support the magnetic array in a fluid flow path such that fluid is allowed to flow over said magnetic array.

16. The filter of claim 15, wherein said arm pieces are flexible so as to bend upon insertion of said magnetic array into said fluid flow path.

17. The filter of claim 15, wherein said fluid is power steering fluid.

18. The filter of claim 15, wherein said magnetic array has a hollow shaft along said center axis, and wherein said support piece comprises a rod slidably engaged by said hollow shaft.

19. The filter of claim 18, wherein said rod is flexible.

20. The filter of claim 15, wherein each of said arm pieces comprise a disc shaped center and a plurality of arms extending substantially radially from said disc shaped center.

21. The filter of claim 20, wherein said arms extend from said disc shaped center at an angle of approximately 60° from said center axis.

22. The filter of claim 15, wherein said arm pieces are made from a flexible material.

23. The filter of claim 15, wherein said magnets are separated by a plurality of disc shaped pole pieces.

24. The filter of claim 15, wherein said fluid is oil.

25. A filter for the removal of metallic particles from a fluid, said filter comprising:
- a magnetic body configured to attract and retain magnetically attractable particles present in a fluid flow path, said magnetic body comprising a plurality of magnets separated by a plurality of pole pieces; and
- attaching means for attaching the filter in a fluid flow path of a system requiring filtering of a fluid, so as to allow fluid to flow over and around the magnetic body, wherein said attaching means is interleaved between said magnets.

26. The filter of claim 25, wherein said system is an engine.

27. The filter of claim 25, wherein said system is a transmission.

28. The filter of claim 25, further comprising a rod, assembled along a center axis of said magnetic body so as to support said magnetic body.

29. The filter of claim 28, wherein said rod is flexible.

30. The filter of claim 25, wherein said attaching means comprises a plurality of arm pieces extending radially from a center axis of said magnetic body.

31. The filter of claim 30, wherein said arm pieces are interleaved between said magnets.

32. The filter of claim 30, wherein each of said arm pieces comprise a disc shaped center portion and a plurality of holding arms extending from said disc shaped center portion.

33. A fluid filter apparatus comprising:
- a magnetic array comprising a plurality of magnets;
- a plurality of arm pieces extending substantially radially from a center axis of said magnetic array, wherein said magnetic array has a hollow shaft along said center axis, and wherein said arm pieces extend beyond a radius of at least one of said magnets; and
- a support piece configured to support the magnetic array in a fluid flow path such that fluid is allowed to flow over said magnetic array, wherein said support piece comprises a rod slidably engaged by said hollow shaft.

34. The filter apparatus of claim 33, wherein said rod is flexible.

35. The filter apparatus of claim 33, wherein at least one of said plurality of arm pieces is interleaved between said magnets.

36. A filter apparatus comprising:
- a plurality of magnets;
- a plurality of arm pieces, extending substantially radially from a center axis of said filter apparatus, wherein each of said arm pieces comprise a disc shaped center and a plurality of arms extending substantially radially from said disc shaped center; and
- an assembly piece, configured to support said plurality of magnets and said plurality of arm pieces.

37. The filter apparatus of claim 36, wherein said arm pieces extend beyond a radius of at least one of said magnets.

38. The filter apparatus of claim 36, wherein at least one of said plurality of arm pieces is interleaved between said magnets.

* * * * *